United States Patent [19]
Good et al.

[11] 3,744,427
[45] July 10, 1973

[54] FUEL GRAIN WITH OPEN-CELLED MATRIX CONTAINING LITHIUM

[75] Inventors: Carl D. Good, Seattle; Donald R. Poole, Woodinville; Eckart W. Schmidt, Bellevue, all of Wash.

[73] Assignee: Rocket Research Corporation, Redmond, Wash.

[22] Filed: Sept. 11, 1968

[21] Appl. No.: 759,041

[52] U.S. Cl............... 102/100, 60/220, 149/2, 149/5, 149/17, 149/22, 149/114
[51] Int. Cl............... C06d 5/10
[58] Field of Search............ 149/2, 17; 60/219, 60/220; 102/99, 100, 102

[56] References Cited
UNITED STATES PATENTS

| | | | |
|---|---|---|---|
| 3,191,535 | 6/1965 | Mulloy | 149/2 X |
| 3,143,446 | 8/1964 | Berman | 149/18 X |
| 3,133,841 | 5/1964 | Kuehl | 149/17 X |
| 3,204,560 | 9/1965 | Gustavson | 149/2 X |
| 3,377,955 | 4/1968 | Hodgson | 149/17 X |
| 3,158,994 | 12/1964 | Hodgson | 149/2 X |

*Primary Examiner*—Benjamin R. Padgett
*Attorney*—Graybeal, Cole & Barnard

[57] ABSTRACT

A reactor for a high specific impulse rocket motor and a method of generating a thrust with a high specific impulse propellant having a hydrogen or like working fluid. Combustion is accomplished by injecting a liquid oxidizer on a fuel grain characterized by an open-celled foamed matrix having a high degree of porosity to hold lithium or other fuel that becomes partially liquid under combustion chamber conditions. The matrix structure includes a metal, graphite or graphite-felt matrix having a melting temperature greater than the vaporization temperature of the lithium so that the liquefied lithium adheres to the matrix structure by surface tension under combustion conditions. The metal matrix may itself be a high performance fuel, such as aluminum or beryllium, coated with a metal of higher melting temperature. The fuel is loaded into the matrix structure while in a liquid state and in an inert atmosphere, either by immersion or by use of vacuum.

10 Claims, 4 Drawing Figures

INVENTORS:
CARL D. GOOD
DONALD R. POOLE
ECKART W. SCHMID
BY
Graybeal, Cole & Barnar
ATTORNEYS

FUEL GRAIN WITH OPEN-CELLED MATRIX CONTAINING LITHIUM

BACKGROUND OF THE INVENTION

1. Field of the Invention

This invention relates to rocket motor design and, more particularly, to a rocket motor fuel grain wherein the fuel is loaded in a matrix structure capable of holding the fuel in a liquid state under combustion chamber conditions so that unreacted fuel is not exhausted from the combustion chamber. The invention also relates to methods of loading porous matrix structures with highly reactive solid fuels for use in a rocket motor combustion chamber. The invention further relates to a rocket propulsion system utilizing a five component propellant, namely, lithium and beryllium or like metal fuels and fluorine and oxygen oxidizers, together with a hydrogen or like working fluid.

2. Description of the Prior Art

Lithium-fluorine-hydrogen and beryllium-oxygen-hydrogen propellant systems heretofore have been known to be very high specific impulse propellants. The former propellant system is disclosed and claimed in Bridgforth U.S. Pat. No. 3,112,608 and the latter in Bridgforth U.S. Pat. No. 3,112,609, both of which issued on Dec. 3, 1963. In these patents it is shown that these tripropellant systems respectively exhibit higher specific impulse characteristics than hydrogen-fluorine or hydrogen-oxygen bipropellant systems.

One of the most effective methods of extracting the high performance energy of these tripropellant systems is by application of the hybrid or, more specifically, the tribrid concept wherein the fuel (e.g. lithium) is incorporated in a solid fuel grain and a liquid oxidizer is injected over the fuel grain. A structural matrix or binder, however, is essential when using lithium fuel since lithium is molten over a large temperature range and is a good thermal conductor. If the lithium is not constrained, a thick lithium melt layer develops, and the shearing action of the gases flowing past the liquid surface induces an axial flow of molten lithium, with attendant loss in performance, by reason of the lithium flow rate into the combustion zone being greater than that predicted, even to the extend of unburned lithium being exhausted through the nozzle. The binders heretofore used to retain the liquid lithium layer in the combustion chamber until reacted with the oxidizer, or to reduce the thermal conductivity of the fuel grain so as to reduce the thickness of the molten layer, have had a low energy release and thus have reduced the performance potential of the system.

In another feature of the invention the matrix fuel grain concept is applied to a five component propellant in a rocket system. Five component propellants and other various multicomponent propellant systems have been previously examined theoretically. For example, an article written by L. J. Gordon and J.B. Lee was published in The American Rocket Society Journal, Volume 32 at page 600, in 1962. Basically this article discussed the theoretical performance of a five-component propellant system utilizing lithium, beryllium, fluorine, oxygen and hydrogen. Although the authors' theoretical evaluations indicated the possibility that five component propellants may be desirable for rocket systems, the means of producing a feasible system utilizing these five components was heretofore unknown due to the difficulties in obtaining a practicable fuel grain.

SUMMARY OF THE INVENTION

This invention is directed to a fuel grain for a reactor useful in a rocket propulsion system. In the fuel grain a high energy fuel, particularly lithium, is held in a matrix structure to confine the liquid layer formed until reacted with the oxidizer which preferably is fluorine. In other words, rather than add binders to reduce the melt layer, the lithium is held in the matrix structure as a liquid until reacted. Beryllium or other fuels may also be used. Basically the fuel is loaded in a matrix structure which includes a component having a melting temperature greater than the vaporization temperature of the loaded fuel at the operating chamber pressure of the rocket. The matrix structure must have proper pore size so as to hold, by surface tension effects, the surface layer of molten fuel generated during combustion. In addition, the matrix structure may itself be a high energy fuel, such as beryllium, adding to the performance of the system.

In the preferred form of the invention the matrix structure is an open-celled foamed metal, such as beryllium or a metal of lesser energy potential, such as aluminum which may be coated with a metal, such as chromium or nickel, having a melting point greater than the vaporization temperature of the lithium. In the alternative the beryllium could be admixed as a micron-size powder with the solid lithium to offset the reduced energy potential of a matrix structure using a single low-energy, high-melting point metal, such as nickel. The void size and content of the matrix structure is designed to produce the greatest fuel loading but with sufficient matrix structure surrounding the fuel to utilize the surface tension effects to retain the surface layer of molten lithium generated during the motor firing.

As lithium, for example, is highly reactive, it forms a skin or surface layer in air or contaminated inert atmospheres. Thus, in the absence of a pure inert atmosphere, it becomes necessary to alter the technique of loading the lithium into the porous matrix structure. According to the present invention liquid lithium is forced or drawn through the matrix structure by vacuum while the matrix structure is in a closed container that may be the combustion chamber of the reactor.

Additionally, with the use of the above concepts, feasible rocket systems using three components, namely, solid fuel, oxidizer and working fluid, or five components, namely, two solid fuels, two liquid oxidizers, and working fluid, are made possible. Basically, the lithium fuel is loaded either with or without micron-size beryllium powder admixed, into a matrix structure of another combustible metal, which may include beryllium. Liquid fluorine and oxygen oxidizers after being partially reacted with hydrogen to raise their temperatures are reacted with the lithium and beryllium, respectively, and the combustion products combined with hydrogen as a working fluid.

DESCRIPTION OF THE PREFERRED EMBODIMENTS

Figure 1:
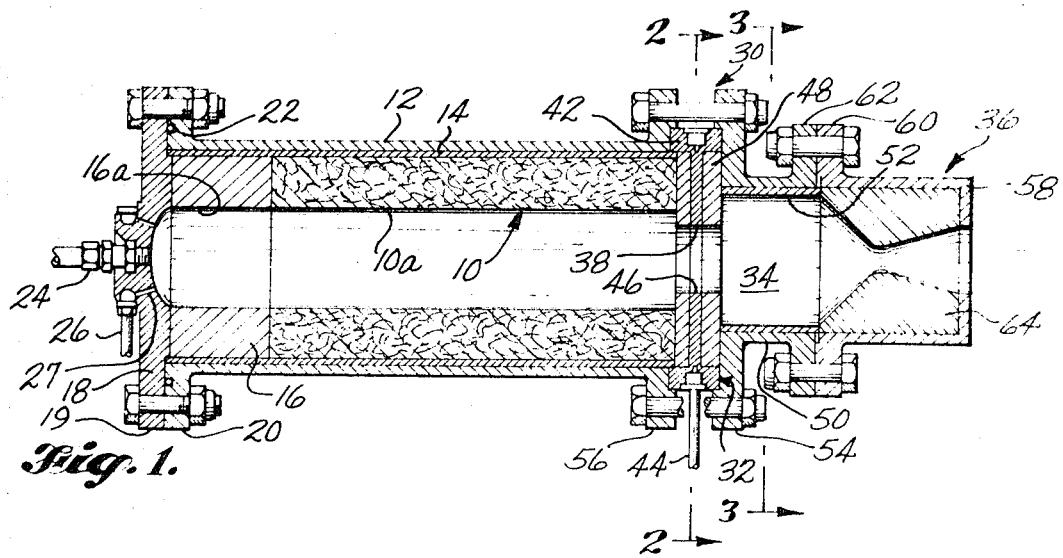
FIG. 1 is a schematic, longitudinal sectional view of a rocket motor including a high energy fuel grain incorporating the invention.

The rocket motor shown in FIG. 1 comprises a loaded fuel grain 10, to be described in more detail hereinbelow, in cylindrical form. The fuel grain is housed in a casing or combustion chamber 12 and is insulated from the walls of the casing by a linear of a heat resisting material, such as graphite. An end of the fuel grain 10 abuts against a conventional splash block of an inert material, such as asbestos filled PBAN (polybutadiene acrylic nitrile). The purpose of the splash block is to reduce or eliminate uneven fuel grain regression rates by allowing sufficient mixing and parallel alignment of the flow upstream in the casing prior to contacting the fuel grain. The fuel grain 10 and splash block 16 are provided with center bores 10a and 16a, respectively, with the center bore 10a becoming enlarged from combustion.

An injector closure 18 covers the forward end of the casing 12, to the left as viewed in FIG. 1, and is provided with a peripheral flange 19 which is securely bolted to a peripheral flange 20 welded to the casing 12. O-ring seals 22 are mounted between the bolted flanges. A liquid oxidizer injector nozzle 24, in the preferred embodiment specifically for fluorine, is mounted to the center of the injector. The injector nozzle is conventional and is designed to provide a full jet spray, cone-type as is well known in the art. A hydrogen inlet 26 is also provided in the injector closure 18 and is aligned with a passage 27 to allow the ingress of hydrogen into the casing. The purpose of the hydrogen is to mix with the liquid fluorine injected through the spray nozzle 24 causing partial combustion and raising the temperature of the fluorine prior to contacting the fuel grain 10.

Figure 2:
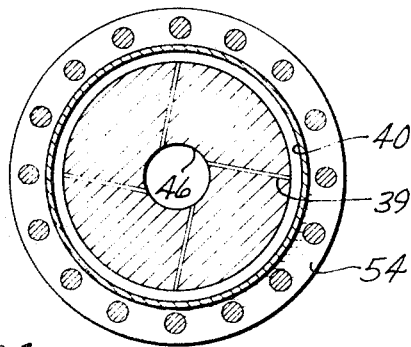
FIG. 2 is a vertical sectional view taken along line 2—2 of FIG. 1 showing means for introducing a working fluid downstream of the fuel grain.
Figure 3:
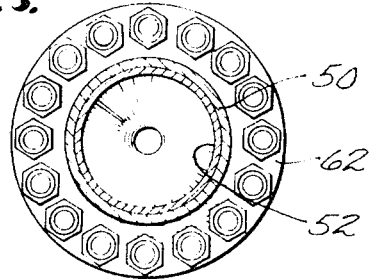
FIG. 3 is a vertical sectional view taken along line 3—3 of FIG. 1.

An aft closure 30 is provided downstream of the fuel grain 10, to the right as viewed in FIG. 1, and includes three general sections: a turbulator or mixer section 32, an aft mixing section 34, and a nozzle section 36. The turbulator 32 includes a stainless steel transverse circular plate 38 having four equidistantly spaced, injector bores 39. The injector bores open at their outer ends in a peripheral manifold opening 40 formed in a circumferential ring 42 that is integrally formed on the circular plate 38. The manifold opening communicates with a hydrogen working fluid inlet 44. The innermost ends of the injector bores 39 terminate in a cylindrical bore 46 through which the products of combustion will pass. As is best shown in FIG. 2 the bores are arranged neither radially nor tangentially with respect to the cylindrical bore 46 but approximately midway between these two conditions so as to provide optimum mixing of the hydrogen with the products of combustion passing from the fuel grain. Two circular graphite wafers 48 are provided, one on each side of the circular plate 38 to protect the turbulator from thermal damage. The purpose of the turbulator is to introduce generally tangentially to the transverse cross section of the combustion products a hydrogen working fluid, or a suitable substitute, to promote mixing of the combustion products and the hydrogen so that the heat from the products of combustion is passed on to the hydrogen. The use of a working fluid in this manner will increase the specific impulse of the system as is discussed in more detail in the aforementioned Bridgforth patents.

The aft mixing section 34 includes a cylindrical casing 50 also of stainless steel and is lined with a pyrolytic graphite sleeve 52. An upstream peripheral flange 54 is welded to the aft casing 50 and is secured by bolts to a peripheral flange 56 that is welded to the downstream end of the casing 12. The flanges 54 and 56 also retain the turbulator 32 in position adjacent the aft end of the fuel grain 10. The purpose of the aft mixer section is to allow additional engine volume for the combustion and mixing process to go to completion after the final addition of hydrogen at the turbulator.

The nozzle section 36 includes a partially closed cylindrical casing 58 of stainless steel or other suitable material and is provided with a peripheral flange 60 that is bolted to a downstream peripheral flange 62 integrally welded to the casing 50. A nozzle 64 of pyrolytic graphite is positioned in the nozzle casing 58. The purpose of the nozzle section is, of course, to produce thrust from the high velocity working fluid emitted from the aft mixing section 34.

As should be readily understood by those skilled in the art the hydrogen and fluorine introduced from any suitable source, not shown, through the injector closure 18 will immediately react consuming a portion of the fluorine and raising the temperature of the remaining fluorine to effect complete evaporation of all the injected propellant droplets which otherwise may adversely affect specific impulse. The hydrogen also aids in establishing a uniform flow pattern at the entrance to the fuel grain to reduce uneven regression rates in the fuel grain. Next, the heated fluorine vapor reacts with the fuel in the fuel grain 10, which for the purpose of description will be assumed to be lithium loaded in a porous matrix structure, and will form lithium fluoride which is the desired product for maximum specific impulse. The amount of hydrogen injected through the injector closure 18 should be kept to a minimum and be just high enough to achieve rapid fluorine vaporization. The combustion products formed pass downstream through the bore 46 in the cylindrical plate 38 where the hydrogen working fluid is introduced. The combustion products and hydrogen will mix condensing the lithium fluoride and the heat liberated will thus be transferred to the hydrogen working fluid. As was mentioned in the aforementioned Bridgforth patents the addition of hydrogen will lower the exhaust product temperature and by decreasing the mean molecular weight will increase the specific impulse of the system.

Turning now to a more detailed description of the fuel grain 10 the preferred form will be described using a lithium fuel. It should be noted, however, that other fuels, such as beryllium; or lower energy fuels, such as aluminum or boron; or mixtures thereof may also be used. Lithium has been chosen as the preferred fuel because it releases high energy, may be used in more complex multipropellant systems, and typifies an important feature of this invention, namely, it may be held as a liquid in a matrix structure under combustion conditions. In a combustion chamber a substantial layer of molten lithium is present in the fuel grain because lithium melts at about 179°C and has high thermal conductivity. This molten layer must be constrained against gravitating to the bottom of the chamber or being carried out of the chamber unreacted with the combustion products. A schematic illustration of the lithium phases in a combustion chamber is best shown, for example, in FIG. 4.

Figure 4:
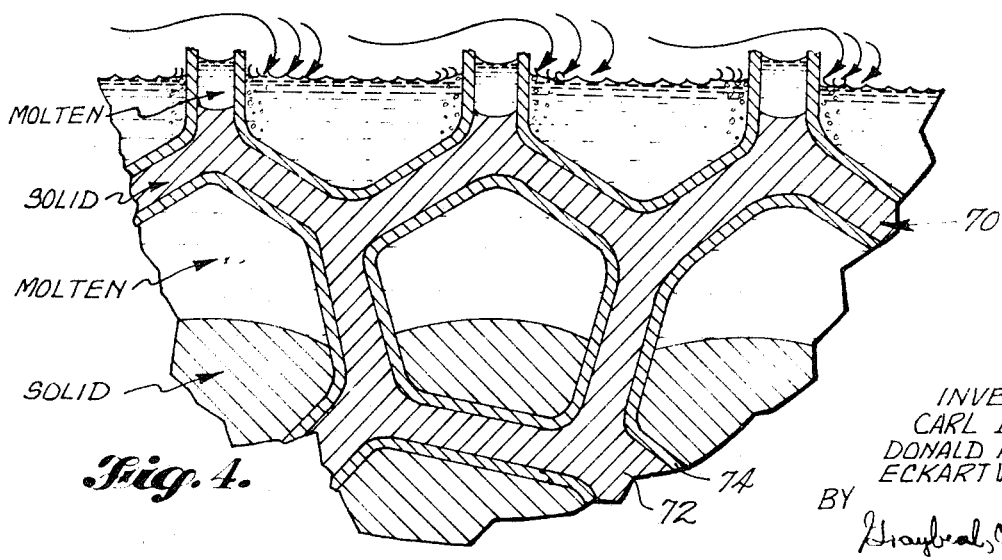
FIG. 4 is a schematic, greatly enlarged, fragment of a fuel grain including an open-cell foamed metal matrix structure and indicating the condition of the components of the grain under combustion conditions.

To retain the liquid lithium in the fuel grain 10 under combustion conditions the fuel is loaded in a porous matrix structure identified generally in FIG. 4 by the reference character 70. The term "loaded" as used herein means filling or substantially filling the voids in the matrix structure with a fuel. The matrix structure may be one of several forms. For example, it may be graphite or graphite felt, a sintered metal, or an open-celled foamed metal. Several metals are: boron, aluminum (to be coated if used with lithium), nickel, chromium, tungsten, and beryllium, for example. The metal preferably should have a melting temperature greater than the vaporization temperature of the lithium. A combination of metals may be used, one of a high energy potential, such as beryllium, or of a lower energy potential, such as aluminum, and either coated with a very low energy but high melting point metal, such as chromium, nickel, or the like. It may not be necessary to coat the beryllium metal as it may not melt prior to combustion of the lithium liquid which it is holding. The optimum material of the matrix structure will be one that yields the highest energy upon reaction with an oxidizer, has a good combustion efficiency when used in a matrix form, and yet remains solid for a sufficient time to restrain the liquid lithium in the chamber until completely reacted with the oxidizer. Several examples of fuel grains will be given herein below more or less approaching these optimum characteristics:

Example 1. Solid lithium loaded in a matrix structure of a beryllium core with or without a nickel or chromium coating layer. The oxidizer in this case would be either liquid oxygen, liquid fluorine or preferably both liquid oxygen and liquid fluorine introduced in predetermined amounts to stoichimoetrically combine respectively with the beryllium and lithium. When combined with hydrogen as a working fluid a system using such a fuel grain potentially exhibits the highest energy of any known propellant combination.

Example 2. Another multipropellant combination using liquid oxygen and liquid fluorine as oxidizers, is micron-size beryllium powder admixed in solid lithium and loaded into a matrix structure of chromium or nickel metal.

In Examples 1 and 2 the specific impulse of the system would lie somewhere between the maximum specific impulses of the beryllium-oxygen-hydrogen system and the lithium-fluorine-hydrogen systems discussed in the aforementioned Bridgforth patents, that is, somewhere between the theoretical specific impulses of about 456 (patent) at 1,000 psia chamber pressure (shifting or frozen equilibrium) sea level exit pressure for the beryllium system. The relative proportions of the lithium and beryllium would be determined by test results in the particular fuel grain configuration desired and determined by whether the beryllium was present in micron-size powder or as part of the matrix structure.

Example 3. Solid lithium loaded in a metal having a high temperature melting point such as chromium or nickel without a high energy metal, such as beryllium, being used.

Example 4. Lithium loaded in a matrix structure having a solid aluminum core plated or coated with a metal having a high temperature melting point. The purpose of the aluminum core would be to increase the energy potential of the system as in the lithium-beryllium examples since the reacting energy of aluminum is higher than chromium or nickel which would be used as a high temperature plating. Since the aluminum would be liquid at the combustion chamber temperatures the high temperature plating is necessary to provide the structural matrix to hold the liquid lithium and to protrude into the combustion zone to assist in producing turbulence and thus assist in mixing the oxidizer with the vaporized liquid at the matrix surface.

Example 5. The matrix structure could also be graphite which is commercially available in the form of graphite felt. The felt is less rigid than other forms of matrix structures discussed, such as foamed metals, for example. However, the shear forces expected in rocket motors of the type intended are not so high that they could not be withstood by the graphite felt. The graphite felt has excellent void content and thus will hold a high amount of lithium. In addition, since carbon has an atomic weight of only 12 it will not decrease the rocket performance as is known to occur when binders or metals of higher atomic weights are used. The disadvantage of graphite felt is that it is not a high energy fuel and thus does not substantially assist in increasing the energy available in the system.

Another technique and the one preferred for the instant invention is the use of open-cell foamed metals. The open-cell foamed metal matrix structure is preferred since the porosity density and void size may be readily varied, it lends itself well to the use of high energy core metals that may or may not be coated with metals having high melting temperatures, and it is known to be readily machinable for fabrication into fuel grains of various configurations.

A typical lithium loaded fuel grain (over 95 percent volumetric loading) using an open-cell foamed metal matrix structure will be described with reference to FIG. 4 wherein an aluminum core 72 is shown with a coating or plating 74 of chromium or nickel. The plating is as thin as is possible to decrease the amount of low energy metals in the fuel grain but still exhibits sufficient strength to mechanically support the fuel when the aluminum core is melted. Coatings as thick as approximately 0.1 mils have been prepared in this manner. The aluminum is used because of its low cost and higher energy content than a pure chromium or nickel matrix structure. By varying the thickness of the cell filaments, density and strength of the foam may be controlled over a large range. In one example tested, a 10 pore per inch foam was proved adequate for use with conventional composite propellants and the foam density was approximately 4 pounds per cubic foot. Fabrication of a fuel grain using an aluminum foam and of a specific composition by weight of 17.7 percent Li, 2.2 percent Al, 48.2 percent $F_2$, 1.9 percent $O_2$, and 30 percent $H_2$ results in an overall propellant composition containing approximately 90 weight percent lithium with a theoretical vacuum performance of approximately 508 pounds-second/pounds ($p_c$=150 psia, $\epsilon$=40). The small coating of chromium or nickel will, of course, affect this performance to some degree.

(Due to the difficulties in establishing the regression rate, depth of the liquid lithium layer, and the temperatures in the matrix structure at various distances in from the combustion zone it is not known if in all instances the high temperature plating of chromium or nickel is necessary).

Another example of a fuel grain is lithium loaded in a nickel matrix structure without the use of a higher energy core metal, such as aluminum or beryllium, in the matrix structure. This example would of course be easier to manufacture but would exhibit a lower energy release than with the higher energy metals. In an example tested, a 40 mil pore size nickel foam was loaded with liquid lithium and allowed to cool. An axial one-eighth inch center bore was drilled through the grain to establish a surface for combustion. After a short firing, the duration of which was selected to consume only a part of the lithium, an inspection of the fuel grain showed that unreacted lithium was successfully retained in the foam matrix even though it was during the firing (temperature in grain exceeded 800°F, which is 450° above the melting point of lithium).

One difficulty in fabricating a lithium fuel grain using an open-cell foamed metal matrix structure is that the molten lithium reacts with air and will form a skin that will reduce the free flow of the liquid lithium into the matrix structure. One technique for eliminating the skin formation is to load the fuel grain by immersing the matrix structure in molten lithium while in an ultra pure inert atmosphere. A second technique is to allow some skin formation by holding the liquid lithium in a practically inert atmosphere, such as commercially available argon, and to draw the liquid lithium into the matrix structure by vacuum. The vacuum loading is accomplished by placing the open-cell metal matrix structure in a container, preferably the casing 12 of the rocket motor, and while in an inert atmosphere of commercially available argon introducing the liquid lithium into one end of the casing while the inside of the casing is in a vacuum so that the molten lithium is forceably drawn through the matrix filling substantially all of the pores thereof. A fuel grain loaded in this manner is, of course, bonded in-place in the rocket chamber.

From the foregoing, various other modifications, arrangements, and grain fabrication techniques will occur to those skilled in the art. For example, various fuels other than lithium may be loaded in a combustible matrix structure with the material of the matrix structure exhibiting either high or low energy potential. The system may employ liquid or gaseous oxidizers and such other oxidizers as oxygen difluoride $OF_2$ or chlorine pentafluoride $ClF_5$ are also feasible. Various working fluids may be used to produce high specific impulse rocket motors. The fuel grain may have other uses not requiring high specific impulse. The invention, therefore, is not to be limited by the examples described but only by the scope of the accompanying claims.

What is claimed is:

1. A fuel grain for use in a rocket motor utilizing fluorine and/or oxygen as the oxidizer, said fuel grain comprising:
   a. an open-celled matrix structure extending essentially throughout the body of the fuel grain;
   b. a lithium or lithium containing fuel loaded in the open-cells of said matrix structure, at least part of said matrix structure having a melting temperature greater than the boiling temperature of the lithium.

2. The fuel grain defined by claim 1, wherein said matrix structure comprises an open-celled foamed metal.

3. The fuel grain defined by claim 2, wherein said foamed metal includes a low density metal, essentially all surfaces of which are coated with a metal having a melting temperature greater than the boiling temperature of the lithium fuel.

4. The fuel grain defined by claim 3, wherein said open-celled foamed metal comprises nickel.

5. The fuel grain defined by claim 3, wherein said open-celled metal includes beryllium.

6. The fuel grain defined by claim 1, wherein said matrix structure includes graphite.

7. The fuel grain defined by claim 1, wherein said fuel is a mixture of solid lithium and micron-size beryllium powder.

8. The fuel grain defined by claim 1, wherein said matrix structure includes a material selected from the group consisting of nickel, chromium, beryllium, boron, graphite, graphite felt, and aluminum coated with nickel or chromium.

9. The fuel grain defined by claim 1, wherein said fuel includes beryllium and said matrix structure includes tungsten.

10. The fuel grain defined by claim 1, wherein said matrix structure is aluminum coated with a metal selected from the group consisting of chromium and nickel.

* * * * *